US005419407A

United States Patent [19]

Meyer et al.

[11] Patent Number: 5,419,407

[45] Date of Patent: May 30, 1995

[54] TRIGGERING MECHANISM FOR A SAFETY DEVICE IN A VEHICLE, PARTICULARLY FOR A SIDE AIRBAG

[75] Inventors: Michael Meyer, Sindelfingen; Guido Wetzel, Neuburg/Donau; Manfred Mueller, Deizisau; Luigi Brambilla, Boeblingen, all of Germany

[73] Assignee: Mercedes-Benz AG, Stuttgart, Germany

[21] Appl. No.: 218,588

[22] Filed: Mar. 28, 1994

[30] Foreign Application Priority Data

Mar. 26, 1993 [DE] Germany ........................ 43 09 827.4

[51] Int. Cl.[6] ........................ B60K 28/10; B60K 21/32

[52] U.S. Cl. .................................... 180/274; 280/735; 280/730.2

[58] Field of Search ................... 180/274; 280/730 A, 280/735

[56] References Cited

U.S. PATENT DOCUMENTS

| | | | |
|---|---|---|---|
| 4,966,388 | 10/1990 | Warner et al. | 280/730 A |
| 5,172,790 | 12/1992 | Ishikawa et al. | 280/735 |
| 5,179,256 | 1/1993 | Haglund | 280/735 |
| 5,281,780 | 1/1994 | Haland | 180/274 |

FOREIGN PATENT DOCUMENTS

| | | |
|---|---|---|
| 0531989 | 3/1993 | European Pat. Off. . |
| 3716168 | 11/1988 | Germany . |
| 2253595 | 9/1992 | United Kingdom . |

*Primary Examiner*—Kenneth R. Rice
*Attorney, Agent, or Firm*—Evenson, McKeown, Edwards & Lenahan

[57] ABSTRACT

A triggering mechanism for a side airbag has a deformation sensor for determining a rate of deformation. The deformation sensor is made up of a total of two pressure-sensitive sensor elements, which are attached on a firm carrier plate parallel to the outer skin inside the vehicle. Spacer elements support the carrier plate against a structural element running parallel to the outer skin. The pressure-sensitive surface of a first sensor element in this case faces the outer skin and the pressure-sensitive surface of a second sensor element faces the structural element. The spacer elements are designed, for example, using predetermined buckling points, clip elements, etc., in such a manner that they withstand a pressure on the support plate only up to a threshold and, if the threshold is exceeded, yield abruptly. This is so that, in the event of a deformation-induced force effect, the sensor elements respond one after the other. An evaluation circuit checks the time interval between the two sensor signals and, below a critical time, sends a triggering signal to the side airbag.

15 Claims, 3 Drawing Sheets

2
6
1
5.3
5.4
4
5
3
5.1
5.2

TRIGGERING MECHANISM FOR A SAFETY DEVICE IN A VEHICLE, PARTICULARLY FOR A SIDE AIRBAG

BACKGROUND AND SUMMARY OF THE INVENTION

The invention relates to a triggering mechanism for a safety device in a vehicle, in particular for a side airbag. The triggering device has a deformation sensor which is made up of at least one pressure-sensitive sensor element. The triggering mechanism is arranged directly under the outer skin of the vehicle and, in the event of a collision-induced deformation of the outer skin, electric deformation signals are emitted to an evaluation circuit. The evaluation circuit determines a rate of deformation in order to trigger the safety device if a threshold value is exceeded.

Passive safety devices, which in the event of an accident are triggered without any action on the part of the vehicle occupants, have long been known. For example, the airbag system which by now is standard equipment in most motor vehicles, automatically inflates an air cushion in the steering wheel or dashboard in the event of a frontal collision of the vehicle against an obstacle in order to protect the occupants against head injuries.

In order to improve protection also in the event of a side collision of the vehicle, it is possible to arrange airbag systems in the side region of the vehicle. Since there are only minimal crash zones which absorb part of the collision energy in the side region, the time period available to bring a side airbag into a state which affords effective protection is very much smaller than in the case of a frontal collision. Therefore, high requirements for a quick and reliable response are demanded of a deformation sensor and an evaluation circuit for detecting a side collision. However, unnecessary triggering of the safety device is also to be avoided if the occupants are not endangered, for example, if when parking an obstacle very slowly deforms the outer skin of the vehicle. Therefore, it is also advisable to measure the rate at which the outer skin is deformed.

A triggering mechanism having a deformation sensor for determining a rate of deformation is generally known from German Patent document 3,716,168. The deformation sensor is arranged directly underneath the outer skin in the side region of the vehicle and extends over the entire width of a door. The deformation sensor is made up of two sensor elements arranged one behind the other at a small distance. As soon as the outer skin is deformed by an external force, the sensor elements respond, one after the other, and emit electric signals to an evaluation circuit. With a given spatial distance between the two sensor elements, the time interval between the two signals depends solely on the rate at which an obstacle deforms the skin, i.e., pushes into the vehicle. To a limited extent, this measure of the rate of deformation can be used to reach a conclusion as to the impending danger to the occupants. If a critical rate is exceeded, therefore, the safety device is triggered. The evaluation circuit checks the time sequence of the emitted signals and, if the sequence is correct and other preconditions regarding strength and duration are satisfied, triggers the safety device. Provided as sensor elements are light guides which give off a signal in the event of a malfunction. A further exemplary embodiment provides pressure sensors in the bearings of structural elements in the side region of the vehicle, for example, reinforcing tubes.

A disadvantage of the known deformation sensor is that its installation and exchange, for example if the sensing hardware is defective, requires considerable expenditures. The known arrangement also requires the first sensor element to be destroyed or badly damaged before the second sensor element ever responds. The first sensor element will also be destroyed or badly damaged even for the eventuality that the deformation is slow and is not assessed as critical in terms of safety by the evaluation circuit. Therefore, registration of a slight collision, which is virtually non-destructive for the deformation sensor, is rarely possible and thus causes increased repair costs.

There is therefore needed a deformation sensor which is inexpensive, avoids the disadvantages of the known deformation sensor, and can largely exclude the possibility of the safety device being inadvertently triggered.

These needs are met according to the present invention by a trigger mechanism for a safety device in a vehicle, in particular for a side airbag. The triggering device has a deformation sensor which is made up of at least one pressure-sensitive sensor element. The triggering mechanism is arranged directly under the outer skin of the vehicle and, in the event of a collision-induced deformation of the outer skin, electric deformation signals are emitted to an evaluation circuit. The evaluation circuit determines a rate of deformation in order to trigger the safety device if a threshold value is exceeded. At least one sensor element is attached on a fixed carrier plate, parallel to the outer skin. Spacer elements support the carrier plate against a structural element in the vehicle running parallel to the outer skin so that, in the event of an outer force effect on the outer skin, a first reliable response of the sensor element, facing the outer skin with its pressure-sensitive side, is ensured. The spacer elements yield if the force effect increases further above a defined threshold, in such a way that the carrier plate is brought against the structural element, so that, upon striking the structural element, a second sensor signal is emitted.

An advantage of the deformation sensor according to the present invention is that a collision-induced force effect on the first sensor element is passed on by the common carrier plate to the spacer element. The spacer elements, which form a certain threshold, yield to the pressure until the carrier plate or the second sensor element strikes the member. By virtue of the threshold-like response characteristic, which follows the yielding of the spacer elements to an external pressure, a defined, clear response behavior of the deformation sensor is achieved. The design of the deformation sensor according to the present invention with clip elements for clip ping onto the member also offers the advantage of a simple attachment underneath the outer skin.

Other objects, advantages and novel features of the present invention will become apparent from the following detailed description of the invention when considered in conjunction with the accompanying drawings.

DETAILED DESCRIPTION OF THE DRAWINGS

Figure 1:
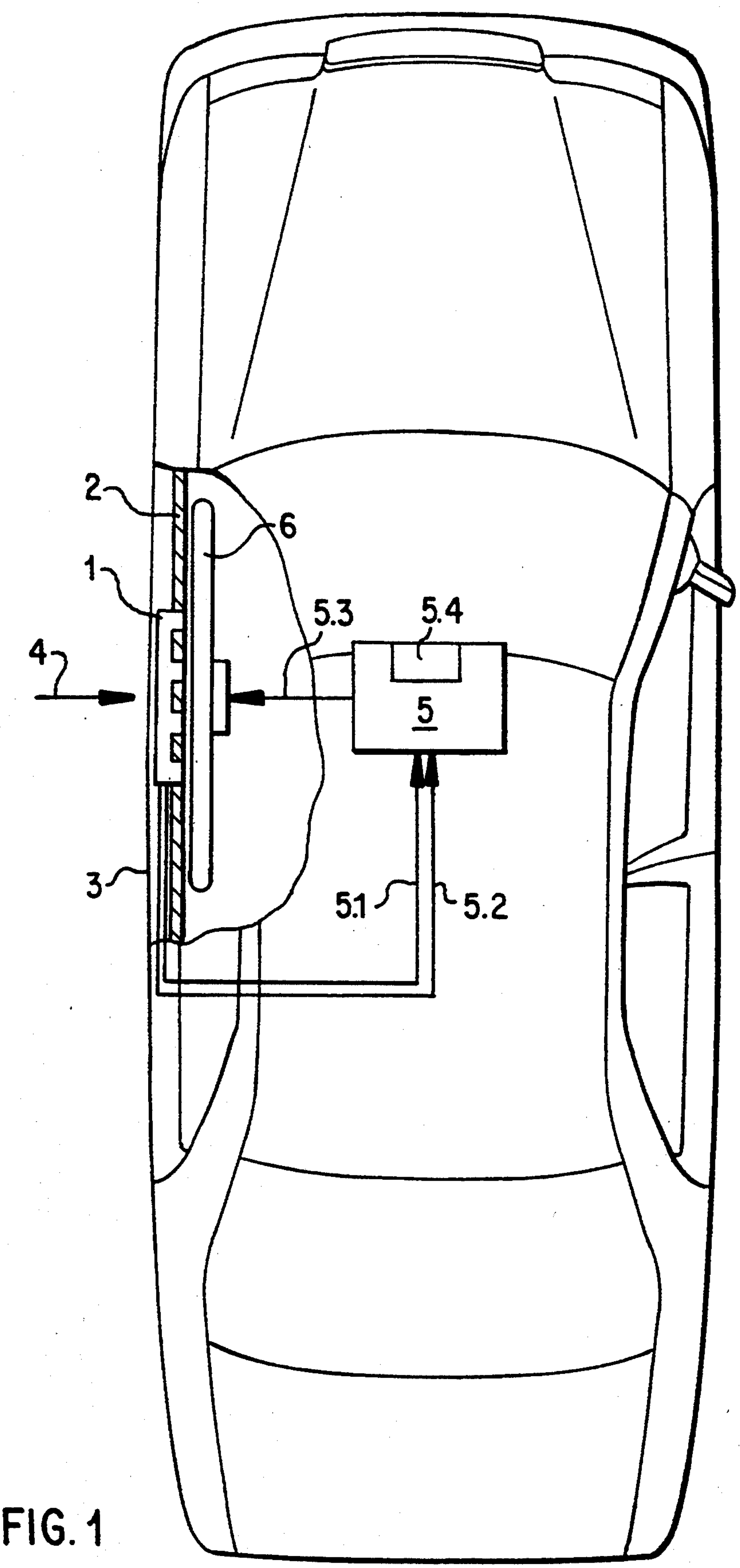
FIG. 1 is a top plan view of a vehicle with the deformation sensor according to the present invention for triggering a side airbag.

FIG. 1 shows a simplified plan view of a vehicle with a deformation sensor 1 according to the present invention. This sensor 1 is attached to a member 2, for example a reinforcing tube within a side door, directly under the outer skin 3 in order to ensure a quick response. In the event of an external force effect indicated by arrow 4, for example due to a collision, the deformation sensor 1 emits electric sensor signals 5.1, 5.2 to an evaluation circuit 5. The evaluation circuit 5 triggers the safety device, here a side airbag 6, via a triggering signal 5.3 if a critical situation for the occupants is detected.

Figure 2:
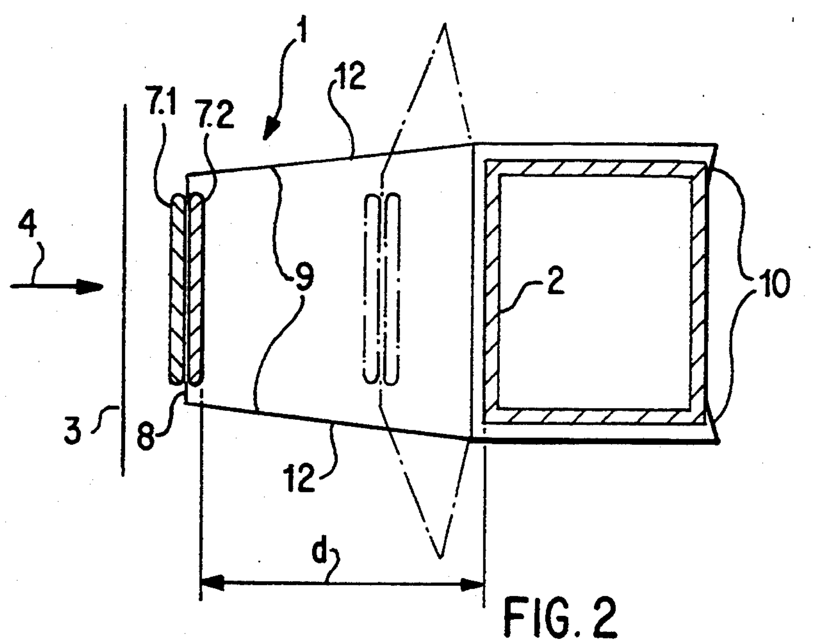
FIG. 2 is a cross-sectional view of a rectangular member with a first exemplary embodiment of the deformation sensor.
Figure 3A:
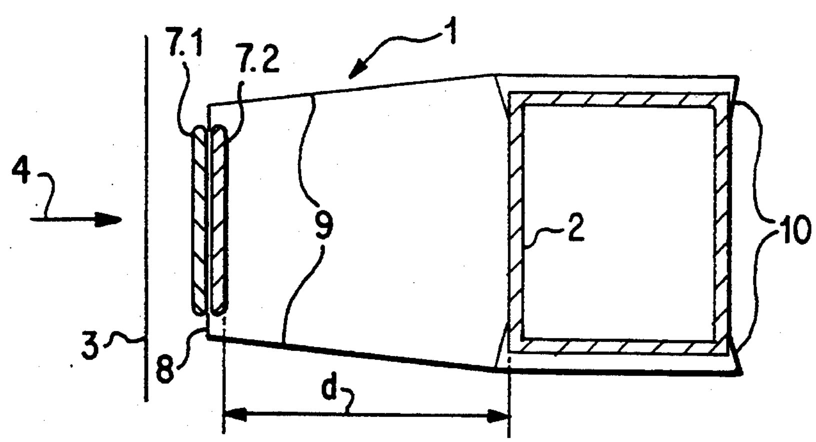
FIG. 3*a* is a cross-sectional view of a rectangular member with a second exemplary embodiment of the deformation sensor.
Figure 3B:
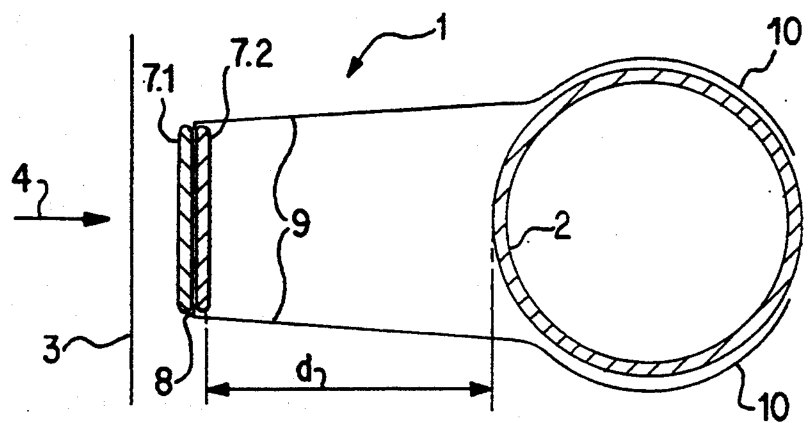
FIG. 3*b* is a cross-sectional view of a round member with a third exemplary embodiment of the deformation sensor.

FIGS. 2, 3*a* and 3*b* show various preferred embodiments of the deformation sensor according to the present invention. The features of the various embodiments that are in common are explained first. Functionally corresponding parts are provided with the same reference numerals. The deformation sensor 1 comprises two sensor elements 7.1, 7.2, which are attached on both sides of a common carrier plate 8 parallel to the outer skin 3. The pressure-sensitive surfaces of the sensor elements 7.1, 7.2 are directed outward. The first sensor element 7.1 consequently detects a force effect which emanates directly from the outer skin 3, while the second sensor element 7.2 detects a force effect from the direction of the member 2. The fixed carrier plate 8 is fixedly held at a constant distance d from the member 2 by spacer elements 9. The spacer elements 9 protrude as legs from the longitudinal sides of the carrier plate 8 and, on the member side, merge with clip elements 10, which serve for clipping onto the member 2. The carrier plate 8 and the spacer elements 9 with the clip elements 10 are produced from a plastic material and form a beam 11, which can be clipped as a whole onto the member 2. Consequently, exchange or retro-fitting of the deformation sensor 1 onto an already installed beam 2 is possible in a very simple and inexpensive manner.

The sensor elements 7.1, 7.2 may advantageously be commercially available resistive film pressure sensors, for example of the manufacturer Interlinks Electronics. The film pressure sensors—also known as FSR sensors (FSR=Force Sensing Resistor)—are inexpensive, have very quick mechanical response times of less than one millisecond, can be manufactured in any desired dimensions, and can be adhesively attached onto the carrier plate 8. An FSR sensor is a contact sensor having a thick-film design. The electrical resistance of the sensor decreases with increasing force exerted in the normal direction onto the sensor surface. In this case, a fixed support is required for a uniform, exact response. In a wide range of approximately three powers of ten, the electrical resistance is approximately inversely proportional to the impressed force. Therefore, measuring currents passed through the FSR sensors largely indicate the acting forces acting and form the electric sensor signals 5.1, 5.2, which drive the evaluation circuit 5. In an even simpler manner, the sensor elements 7.1, 7.2 may be designed as sheet-like, momentary-contact switches, which close a contact when there is a particular pressure loading.

In the first preferred embodiment shown in FIG. 2, predetermined buckling points 12 are provided in the spacer elements 9. When there is a collision-induced force effect 4, the outer skin 3 is deformed and consequently a pressure is exerted on the first sensor element 7.1, causing the latter to respond. The pressure is passed on by the fixed carrier plate 8 and the spacer elements 9 to the member 2, until a critical internal bending stress is exceeded, in which the spacer elements 9 buckle at the predetermined buckling points 12. As a result, the spacer elements 9 lose their flexural rigidity and yield abruptly to the force effect 4 at the predetermined buckling points and, for example, at the transition to the carrier plate 8 and to the member 2 (dashed lines in FIG. 2). Consequently, the carrier plate 8 is made to approach the member 2 and—if there is adequately severe deformation, the carrier plate 8 is pressed against the latter, 80 that the second sensor element 7.2 also responds.

In the case of the second preferred embodiment shown in FIG. 3*a*, no predetermined buckling points are provided. However, the striking surface of the beam 11, which in the first preferred embodiment rested on the member 2 and transferred the pressure to the latter, is replaced by further clip-like formations 13 on the spacer elements 9. These can similarly transfer a collision induced pressure to the member 2, albeit only up to a certain threshold. If this threshold is exceeded, the clip-like formations 13 yield and give way to the pressure. As a result, the clipping is abruptly released. If the force effect 4 persists, the carrier plate 8 approaches the member 2, until, upon impact, the second sensor element 7.2 also responds. By virtue of the design of the spacer elements 9 as legs which act on both sides of the carrier plate 8 and are spread apart as shown approaching the member 2, a guidance of the movement occurs. The clip elements 10 and the clip-like formations 13 may extend over the entire length of the beam or else be formed only at some points for punctiform clipping onto the member 2, as is indicated in FIG. 1, thereby influencing the local response behavior of the deformation sensor 1.

The preferred embodiment in FIG. 3*b* represents an adaptation to a circular cross-section of the member 2 of the features according to the present invention explained with reference to the previous embodiment. In this case, the spacer elements 9, the clip elements 10 and clip-like formations 13, merge smoothly into one another.

A suitable evaluation circuit 5 for evaluating the sensor signals 5.1, 5.2 sent by the sensor elements 7.1, 7.2 is already known from the prior art German patent document noted above. As soon as the first sensor signal 5.1 signals a collision, for example by a threshold value being exceeded, a time window T is set. Only if the second sensor element 7.2 also responds within this time window T, by the second sensor signal 5.2 exceeding a threshold value, is the triggering signal 5.3 sent to the safety device 6. This prevents the safety device 6, i.e. the side airbag, from being triggered in the event of slow pushing-in of an obstacle.

Figure 4:
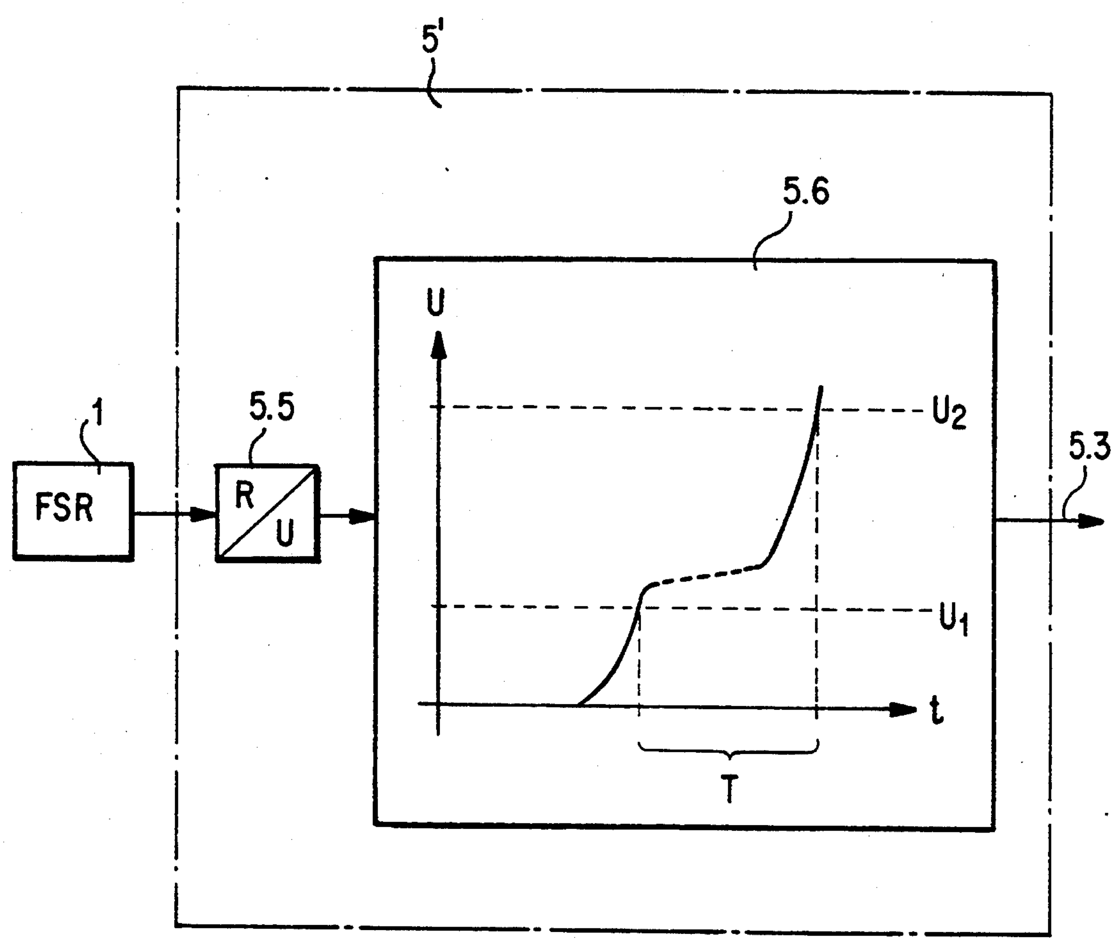
FIG. 4 is a schematic diagram of an evaluation circuit for a deformation sensor with only one sensor element.

The following, fourth design of the triggering mechanism according to the present invention makes use of the properties of the film pressure sensors already mentioned in a special way. The structure of the deformation sensor 1, as for example in FIG. 3*a*, may remain unchanged. The first sensor element 7.1 is a resistive film pressure sensor and the second sensor element 7.2 and the line for the second sensor signal 5.2 are dispensed with. In addition, a new evaluation circuit 5' is required, such as is represented in FIG. 4, in order to evaluate the sensor signal 5.1. The new evaluation circuit 5' in FIG. 4 is composed of a measuring transducer 5.5 and a comparator 5.6. The comparator sends out the triggering signal 5.3. The measuring transducer 5.5 comprises a simple measuring circuit, which converts the FCP resistance R of the film pressure sensor 1 into a voltage U. In a wide range, this measuring voltage U is approximately proportional to the force acting on the sensor surface and is plotted against time t in the diagram 5.6 for a typical, very severe collision. This diagram is explained below by way of example with reference to a deformation sensor 1, which is made up as shown in FIG. 3*a*.

The saddle-shaped profile is brought about by a force acting on the sensor surface abruptly diminishing in the phase in which the spacer elements 9 yield to the acting force 4, for example due to releasing of the clips in FIG. 3*a*—and no longer support the Lilm pressure sensor against a structural element 6 in the vehicle. This region is drawn by dashed lines in the diagram in FIG. 4, since predicting the voltage variation can be difficult. The further increase in the measuring voltage U takes place when the spacer elements 9 can no longer take up any displacement, because the carrier plate 8 is then resting on the member 2. The comparator 5.6 (FIG. 4) compares the measuring voltage U with two predetermined threshold values U1 and U2, where U1<U2 and the first threshold value U1 is below the voltage which corresponds to the force at which the spacer elements abruptly yield. If the first threshold value U1 is exceeded, a time window with the duration T is set, within which the second threshold value U2 must be exceeded by the measuring voltage in order for the triggering signal 5.3 to be sent. Otherwise, once the time T has elapsed, the time window is again cancelled. In this case, it may also be provided that a signal for identifying a slight collision is sent.

In a modification of this preferred embodiment, there may also again be provided a second FSR sensor element 7.2, protected by the carrier plate 8 (for example FIG. 3*a*), which however is connected in parallel with the first FSR sensor element 7.1, 80 that in turn the second line 5.2 (in FIG. 1) can be dispensed with. Consequently, the sum of the force effects on the two FSR surfaces is measured. This has the advantage relevant to safety that the second, steep significant increase in force, decisive for triggering, would also be measured if the first sensor element 7.1 were already destroyed by the collision but the second sensor element 7.2 remained intact.

If the triggering mechanism according to the invention is used, inadvertent triggerings may possibly be caused by the fact that the sensing of the rate of deformation is not a variable which allows an unequivocal conclusion as to the kinetic energy of the striking object. For example, an object with a small collision surface, for example a hammer, which pushes in with a high local rate of deformation could cause triggering of the safety device although its kinetic energy is by far not adequate to endanger the occupants of the vehicle. A suitable countermeasure is to distribute a plurality of deformation sensors according to the invention over the surface to be sensed and to combine their triggering signals in a logic operation (AND operation). Also, if FSR sensor elements which extend over a relatively large area-covering region are used, the risk of inadvertent triggering can be reduced by suitable choice of the switching threshold. Furthermore, it may be provided that the evaluation circuit 5 or 5' additionally uses the signal of a lateral acceleration sensor 5.2, which may be integrated in the evaluation circuit 5 (FIG. 1), in order to obtain a measure of the collision energy. It is thus ensured that the safety device 6 is triggered only if the vehicle is subjected to a lateral acceleration which is dangerous for the occupants.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A triggering mechanism for a safety device in a vehicle having a structural element, comprising:

a deformation sensor formed of at least one pressure-sensitive sensor element arranged directly under an outer skin of the vehicle, said deformation sensor emitting electric deformation signals in an event of a deformation of the outer skin;

an evaluation circuit which receives the deformation signals and determines a rate of deformation in order to trigger the safety device if a threshold value is exceeded;

a carrier plate arranged substantially parallel to the outer skin, said at least one sensor element being secured on the carrier plate;

spacer elements for supporting the carrier plate on said structural element in the vehicle, said structural element extending parallel to the outer skin;

wherein, in the event of the deformation of the outer skin due to an outer force effect, a first sensor signal of the sensor element having its pressure-sensitive side facing the outer skin is generated; and wherein said spacer elements are constructed so as to yield if said outer force effect increases above a predetermined threshold in a manner such that the carrier plate is brought toward the structural element, a second sensor signal is emitted when the carrier plate presses against the structural element.

2. A triggering mechanism according to claim 1, wherein the deformation sensor is formed of two pressure-sensitive sensor elements, one of said two sensor elements being attached on each side of the carrier plate, the pressure-sensitive surface of the first of said two sensor elements facing the outer skin and the pressure-sensitive surface of the second sensor element facing the structural element.

3. A triggering mechanism according to claim 1, wherein the spacer elements have clip elements on a side facing the structural element for clipping onto the structural element.

4. A triggering mechanism according to claim 3, wherein the clipping of the clip elements can be released by an increased outer force effect on the carrier plate.

5. A triggering mechanism according to claim 4, wherein a movement enabled after releasing of the clipping, in which movement the carrier plate approaches the member, is guided by the non-clip-like components of a spacer element.

6. A triggering mechanism according to claim 3, wherein the spacer elements protrude substantially at right angles from the two opposite longitudinal sides of the carrier plate and merge at their end with clip elements for clipping onto the structural element.

7. A triggering mechanism according to claim 6, wherein the carrier plate and the spacer elements with the clip elements are an integral component of a beam, which is clipped as a whole on the structural element.

8. A triggering mechanism according to claim 1, wherein the deformation sensor is arranged in a side region of the vehicle and the evaluation circuit additionally evaluates a signal of a lateral acceleration sensor, and a triggering signal is sent only if both the rate of deformation and the lateral acceleration respectively exceed critical values.

9. A triggering mechanism according to claim 1, wherein the sensor elements are resistive film pressure sensors which are adhesively attached on the carrier plate.

10. A triggering mechanism according to claim 9, wherein the deformation sensor has a single sensor element, facing the outer skin.

11. A triggering mechanism according to claim 2, wherein the two sensor elements are connected in parallel.

12. A triggering mechanism according to claim 9, wherein the two sensor elements are connected in parallel.

13. A triggering mechanism according to claim 10, wherein the evaluation circuit measures the time between two successive significant increases in force which are typical of a severe deformation, and sends a triggering signal if this time is less than a certain critical time T.

14. A triggering mechanism according to claim 11, wherein the evaluation circuit measures the time between two successive significant increases in force which are typical of a severe deformation, and sends a triggering signal if this time is less than a certain critical time T.

15. A triggering mechanism according to claim 1, wherein said safety device is a side airbag.

* * * * *